(No Model.)

C. F. BOWER.
POTATO STEAMER.

No. 297,346. Patented Apr. 22, 1884.

Witnesses,
Charles S. Hyer
Robert Everett

Inventor
Christopher F. Bower
By James L. Norris
Atty.

UNITED STATES PATENT OFFICE.

CHRISTOPHER FABIAN BOWER, OF 43 COLLEGE STREET, LIVERPOOL ROAD, COUNTY OF MIDDLESEX, ENGLAND.

POTATO-STEAMER.

SPECIFICATION forming part of Letters Patent No. 297,346, dated April 22, 1884.

Application filed August 24, 1883. (No model.) Patented in England February 13, 1883, No. 780.

*To all whom it may concern:*

Be it known that I, CHRISTOPHER FABIAN BOWER, a subject of the Queen of Great Britain, residing at 43 College Street, Liverpool Road, in the county of Middlesex, England, gentleman, have invented a certain new and useful Improved Potato-Steamer, for which I have obtained a patent in Great Britain, No. 780, bearing date February 13, 1883, of which the following is a specification.

This invention consists of an improved potato steamer or cooker.

In carrying out my invention I make use of an ordinary saucepan, to which is added an internal detached receptacle made of perforated tin or wire work for the reception of the potatoes or other articles required to be cooked. This receptacle fits easily the inside of the saucepan, but is much shallower than the saucepan, and is for the purpose of keeping the articles to be cooked intact. The inner vessel is also provided with a handle and suitable catches to take onto studs near the top of the saucepan. After boiling a suitable time, the inner receptacle is raised out of the water and secured to the studs attached to the saucepan for the purpose of steaming.

In order that my said invention may be clearly understood, reference is hereby made to the accompanying drawings, in which similar letters of reference indicate corresponding parts.

Figure 1:
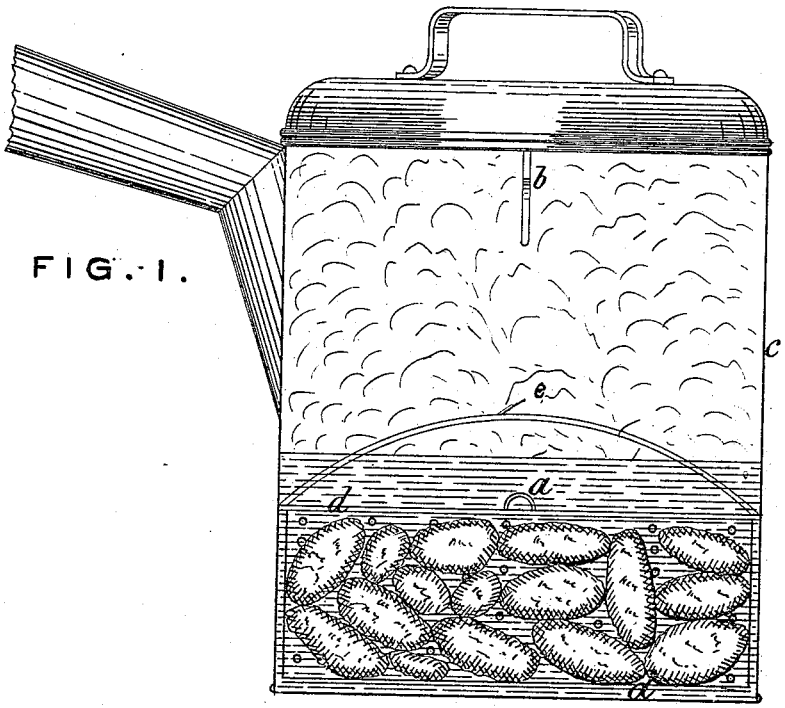
Figure 2:
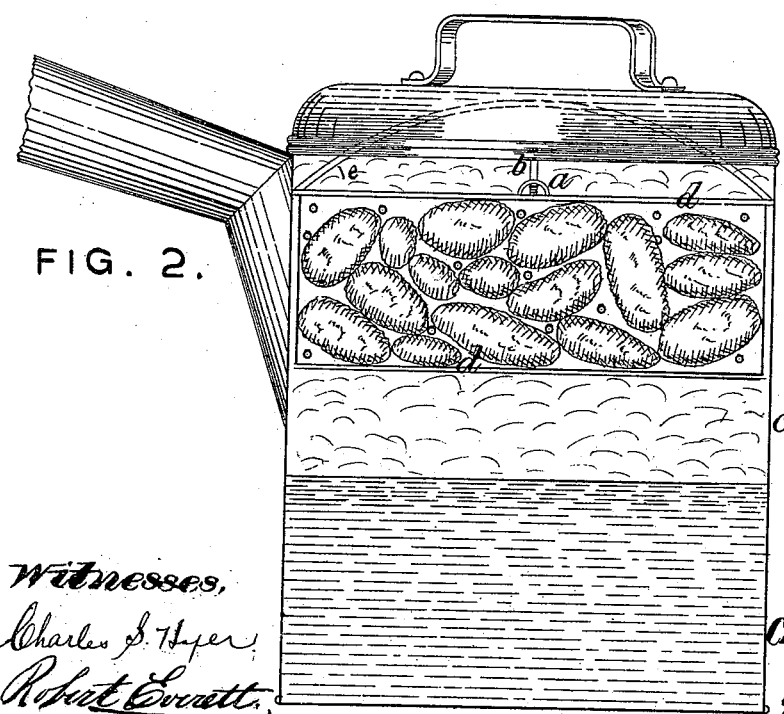

Figure 1 is a sectional elevation showing potatoes in the water for boiling with the inner receptacle down next to the bottom of the saucepan. Fig. 2 is a sectional elevation showing the inner receptacle with the potatoes contained therein raised above the water and enveloped in steam. The inner receptacle is retained in this position by the loop or staple $a$, secured in any suitable manner to the side of the inner receptacle, at or near its top, and stud $b$, secured in any suitable manner to the side of the saucepan at or near its upper end, any number of which may be fitted, one or two being generally sufficient for the purpose, one in the case of a round saucepan and two in the case of an oval-shaped saucepan.

$c$ is a saucepan, which is of the ordinary construction. $d$ is the inner vessel, the bottom and sides or the bottom only of which is perforated with a number of holes, or the same may be constructed of open wire-work, and is provided with a handle, $e$.

It is obvious that my improved potato steamer or cooker can be made either round or oval.

I am aware that it is old to suspend a culinary attachment within a pot from a hook attached to the cover of the pot; but my invention is different therefrom in that the culinary vessel may be suspended within the saucepan independently of the cover, so that the cover can be removed without moving the culinary vessel.

Having thus particularly described and ascertained the nature of my said invention and in what manner the same is to be performed, I claim—

The saucepan $c$, having a stud, $b$, secured thereto at or near its upper end, in combination with the vessel $d$ fitting therein, and having the loop $a$, secured thereto at or near its upper end, and provided with the handle $e$, substantially as described.

In testimony whereof I have hereto set my hand this 10th day of August, 1883.

CHRISTOPHER FABIAN BOWER.

Witnesses:
O. G. BEARD,
8 *Quality Court, Clerk to George Dowing.*
J. WATT,
17 *Gracechurch St., London.*